(12) United States Patent
James et al.

(10) Patent No.: US 7,013,424 B2
(45) Date of Patent: Mar. 14, 2006

(54) DEDICATED PROCESSOR FOR EFFICIENT PROCESSING OF DOCUMENTS ENCODED IN A MARKUP LANGUAGE

(75) Inventors: Zachary A. James, Wake Forest, NC (US); Bala Rajaraman, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 754 days.

(21) Appl. No.: 09/848,828

(22) Filed: May 4, 2001

(65) Prior Publication Data

US 2004/0205694 A1   Oct. 14, 2004

(51) Int. Cl.
*G06F 17/00*   (2006.01)

(52) U.S. Cl. ......................................... 715/513; 712/28
(58) Field of Classification Search ................ 715/513; 712/32, 30, 36, 29, 28, 1
See application file for complete search history.

(56) References Cited

U.S. PATENT DOCUMENTS

| | | | | | |
|---|---|---|---|---|---|
| 5,939,868 | A | * | 8/1999 | Hall et al. ................... | 323/281 |
| 6,014,680 | A | * | 1/2000 | Sato et al. ................... | 715/513 |
| 6,092,089 | A | * | 7/2000 | Lahey et al. ................. | 715/511 |
| 2001/0018697 | A1 | * | 8/2001 | Kunitake et al. ............ | 707/517 |
| 2001/0042078 | A1 | * | 11/2001 | Anwar ......................... | 707/500 |
| 2001/0046862 | A1 | * | 11/2001 | Coppinger et al. .......... | 455/435 |
| 2001/0054046 | A1 | * | 12/2001 | Mikhailov et al. ........... | 707/500 |
| 2002/0035584 | A1 | * | 3/2002 | Scheier et al. ............... | 707/517 |
| 2002/0083096 | A1 | * | 6/2002 | Hsu et al. ..................... | 707/513 |
| 2002/0111924 | A1 | * | 8/2002 | Lewis ........................... | 705/413 |
| 2002/0120776 | A1 | * | 8/2002 | Eggebraaten et al. ........ | 709/246 |
| 2002/0161801 | A1 | * | 10/2002 | Hind et al. .................... | 707/513 |
| 2002/0184101 | A1 | * | 12/2002 | Gidadhubli et al. .......... | 705/26 |
| 2003/0023604 | A1 | * | 1/2003 | O'Brien et al. .............. | 707/100 |

FOREIGN PATENT DOCUMENTS

| | | |
|---|---|---|
| GB | 0362903 A2 * | 11/1990 |
| GB | 2357348 | 12/1999 |
| WO | WO 00/52564 | 3/2000 |

OTHER PUBLICATIONS

"XML and E-Commerce: Opportunities and Challenges", Harbinger Corporation, Mar. 14, 2000, pp. 1-18.*

(Continued)

*Primary Examiner*—William Bashore
*Assistant Examiner*—Laurie Anne Ries
(74) *Attorney, Agent, or Firm*—Synnestvedt & Lechner LLP; Jerry W. Herndon

(57) ABSTRACT

A dedicated processor for efficient processing of documents encoded in a markup language, such as XML. The dedicated processor is capable of performing traditional parsing, transformation and manipulation processes on the document. The special purpose processor frees a general purpose processor to perform other tasks, resulting in an increase in system performance. In one embodiment, the dedicated processor includes a general purpose processor and suitable software which is provided in addition to the general purpose processor which has been traditionally used for processing. In such an embodiment, the dedicated processor may be implemented in a multi-processor system. In another embodiment, the dedicated processor is implemented in special purpose hardware, e.g. as an integrated circuit embodied in silicon in one or more chips. In either embodiment, the dedicated processor may be provided to offload processing locally or remotely.

20 Claims, 5 Drawing Sheets

OTHER PUBLICATIONS

Friedman, Richard, "The J2EE Platform and XML", 2000 JavaOne Conference, San Francisco, CA, Jun. 6-9, 2000, pp. 2-4 and 38-47.*

Microsoft Computer Dictionary, Third Edition, Microsoft Press, 1997, pp. 307.*

Lamming, Mik, et al, "Satchel: Providing Access to Any Document, Any Time, Anywhere", ACM Transactions on Computer-Human Interaction (TOCHI), vol. 7, Issue 3, Sep. 2000, pp. 322-352.*

Usdin, Tommie, et al, "XML: Not a Silver Bullet, But a Great Pipe Wrench", StandardView, vol. 6, Issue 3, Sep. 1998, pp. 125-132.*

Akscyn, Robert M., et al, "KMS: A Distibuted Hypermedia System for Managing Knowledge in Organizations", Communications of the ACM, vol. 31, Issue 7, Jul. 1988, pp. 820-835.*

* cited by examiner

DEDICATED PROCESSOR FOR EFFICIENT PROCESSING OF DOCUMENTS ENCODED IN A MARKUP LANGUAGE

RELATED APPLICATIONS

The present invention is related to U.S. Pat. No. 6,938,204, titled "Array-Based Extensible Document Storage Format" (application Ser. No. 09/652,296, and U.S. Pat. No. 6,941,511, titled "High-Performance Extensible Document Transformation" (application Ser. No. 09/653,080), and U.S. Pat. No. 6,904,562, titled "Machine-Oriented Extensible Document Representation And Interchange Notation" (application Ser. No. 09/652,056), each filed Aug. 31, 2000. These related inventions are commonly assigned to International Business Machines Corporation (IBM), and are hereby incorporated herein by reference.

FIELD OF THE INVENTION

The present invention relates generally to documents encoded in a markup language, such as eXtensible Markup Language (XML), and particularly to processing of XML documents in XML environments, such as a communications network.

DESCRIPTION OF THE RELATED ART

Business and consumer use of distributed computing, e.g network computing, has gained tremendous popularity in recent years. For business purposes, there are two main categories of network interactions between computing elements of distributed computing, namely, those that connect users to business processes and those that interconnect the business process elements. An example of the first is the traditional Web whereby a user may use Web browser software to interact with business data and applications at a Web server using the HyperText Markup Language (HTML) data format transported by the HyperText Transport Protocol (HTTP). An example of the second is traditional "Electronic Document Interchange" (EDI) whereby documents such as requisitions, purchase orders, invoice, shipping notification, etc. existing in standardized electronic formats (such as ANSI X.12 or UN/EDIFACT) are moved between organizational processes by protocols such as X.400, SNADS, TMR, SMTP, etc. For both categories of network interactions, there is a trend toward using the HTTP Web transport protocol and a common data format known as eXtensible Markup Language ("XML").

XML is a tag language, which is a language that uses specially-designated constructs referred to as "tags" to delimit (or "mark up") information. In the general case, a tag is a keyword that identifies the data that is associated with the tag, and is typically composed of a character string enclosed in special characters, i.e., letters and numbers which are defined and reserved for use with tags so that a parser processing the data stream will recognize the tag.

The popularity of XML is due in part to its extensible and flexible syntax, which allows document developers to create tags to convey an explicit nested tree document structure (where the structure is determined from the relationship among the tags in a particular document). Document developers can define their own tags which may have application-specific semantics. Because of this extensibility, XML documents may be used to specify many different types of information, for use in a virtually unlimited number of contexts. A number of XML derivative notations have been defined, and continue to be defined, for particular purposes. "VoiceXML" is an example of one such derivative. References herein to "XML" are intended to include XML derivatives and semantically similar notations such as derivatives of the Standard Generalized Markup Language, or ASGML", from which XML was derived. Refer to ISO 8879, "Standard Generalized Markup Language (SGML)", (1986) for more information on SGML. Refer to "Extensible Markup Language (XML), W3C Recommendation 10 Feb. 1998" which is available on the World Wide Web at URL, for more information on XML.

The extensible tag syntax enables an XML document to be easily human-readable, e.g. to convey the semantic meaning of the associated data values and the overall relationship among the elements of the data. This human-friendly, well-structured format enables a human being to quickly look through an arbitrary XML document and understand the data and its meaning. However, the raw content of most XML documents will never be seen by a human: instead, what the end user sees is typically created using a rendering application (such as an XML parser within a browser) which strips out the tags and displays only the embedded data content. The added overhead of the human-friendly tag syntax makes processing, e.g. parsing, of the document burdensome to the processor. Typically, an XML document is parsed and stored internally as a Document Object Model (DOM) tree representation by an XML parser. DOM trees are physically stored in a tree representation, using objects to represent the nodes in the tree, the attributes of the nodes, the values of the nodes, etc.

Transformations, i.e. operations, are then performed (e.g. by content renderers or style sheet processors) by operating upon this tree representation. For example, a particular transformation may include deleting elements from a document by pruning subtrees from the DOM tree; or renaming elements within a document by traversing the DOM tree to find the occurrences of the element name, and substituting the new name into the appropriate nodes of the DOM tree. (DOM is published as a Recommendation of the World Wide Web Consortium ("W3C"), titled "Document Object Model (DOM) Level 1 Specification, Version 1.0" (1998) and available on the Web at www.w3.org. "DOM" is a trademark of Massachusetts Institute of Technology.) The type of transformation is typically target dependent. For example, such transformation may be performed according to an intended recipient's registered preferences or according to capabilities of a target device, e.g. a Web-enabled wireless telephone. Transformations are very processor intensive and are becoming more prevalent, and thus more burdensome, as a broader range of heterogeneous devices seek to access a common set of data.

The parsing, including creation of a DOM tree, and transformation of documents is typically performed by special purpose software executed by a general purpose hardware processor. For example, these steps are typically performed by a server on an edge of a network, e.g. using a WebSphere® Transcoding Product (WTP) special purpose software manufactured and/or distributed by International Business Machines Corporation of Armonk, N.Y., U.S.A. ("IBM") and executable by a general purpose processor, such as a standard PC's microprocessor.

In some embodiments, the document tree may be manipulated to create a document array model structure, as is generally known in the art. Generally, in an array model, data is organized to represent an ordered set of values that can be accessed by supplying one or more values which uniquely identify one of the values of the set. Accordingly, human-friendly markup language tags are represented in an array model rather than a tree model. The array model simplifies and expedites processing.

In addition, XML documents can be transformed into or represented in the mXML language, a machine-oriented language similar to XML. U.S. Pat. No. 6,904,562, titled "Machine-Oriented Extensible Document Representation And Interchange Notation" (application Ser. No. 09/652,056), filed Aug. 31, 2000, discloses the mXML notation. The mXML notation is more compact than the human-friendly XML notation and therefore provides performance gains in processing and transmission.

The parsing, transformation and other manipulation steps, e.g. XML document recognition, content based style sheet selection, content based routing and other traditional XML processing steps, are tremendously processor intensive, which is burdensome on the general purpose processor and other system resources. Specifically, such processing steps prevent or delay the general purpose processor from performing other tasks required of the general purpose processor.

What is needed is a special purpose, dedicated processor for processing documents encoded in a markup language such as XML which can free the general purpose processor to perform other tasks, and at least a hardware-based dedicated processor which can provide for optimization of processing steps by eliminating or reducing inefficiencies in human-friendly software code of the type heretofore known by relying on machine language characteristics.

SUMMARY OF THE INVENTION

The present invention provides a method and apparatus for efficient processing of documents using a dedicated (special purpose) processor. The dedicated processor is capable of performing traditional parsing, transformations and manipulation processes, e.g. on an XML document. Conceptually, the use of a special purpose processor for processing the document frees the general purpose processor to perform other tasks, resulting in an increase in system performance. In other words, the dedicated processor does not compete for system resources.

In one embodiment, the dedicated processor is implemented in special purpose hardware, e.g. an integrated circuit embodied in one or more silicon chips. This is particularly advantageous because it allows use of machine code and other speed-related advantages typical of hardware implementations. For example, performance can be improved by configuring the dedicated processor to process mXML documents, by first converting XML documents to mXML if necessary. This is particularly advantageous in a hardware-based embodiment. Configuring the dedicated processor to represent documents in array-based notation can also be used to enhanced performance, e.g. in mXML-based embodiments. A hardware implementation is particularly useful in a single processor computer system, e.g. as a hardwired chip in communication with the general purpose processor.

In another embodiment, the dedicated processor includes a general purpose processor and suitable software which is provided in addition to the general purpose processor which has been traditionally used for processing documents encoded in a markup language. For example, one of several general purpose processors in a multi-processor computer system may be designated as the dedicated processor.

In either embodiment, the dedicated processor may be provided remotely, e.g. in a processing device which receives and processes documents before receipt by the intended target. An arrangement is which the dedicated processor is network accessible has been found particularly advantageous because it is capable of supporting numerous devices and thereby offloading processing for numerous devices. Alternatively, in either a hardware-or software-based embodiment, the dedicated processor may be provided locally in the target device, e.g. co-located with a general purpose processor in a single device.

To achieve further performance benefits, the dedicated processor may optionally be configured to carry out XML processing using the array-based notation disclosed in U.S. Pat. No. 6,938,204, titled "Array-Based Extensible Document Storage Format" (application Ser. No. 09/652,296, the transformation techniques disclosed in U.S. Pat. No. 6,941,511, titled "High-Performance Extensible Document Transformation" (application Ser. No. 09/653,080), and the machine-oriented XML notation disclosed in U.S. Pat. No. 6,904,562, titled "Machine-Oriented Extensible Document Representation And Interchange Notation" (application Ser. No. 09/652,056), each filed Aug. 31, 2000.

The present invention provides a method for efficient processing of a document encoded in a markup language, the method comprising the step of communicating an array-based data model representing the document to an application process through a bus of a printed circuit board. The present invention further provides a method for efficient processing of a document encoded in a markup language comprising the steps of receiving a document intended for delivery to a target, processing the document using a special purpose processor, and passing the processed document to the target for further processing by a general purpose processor.

DETAILED DESCRIPTION

Figure 1:
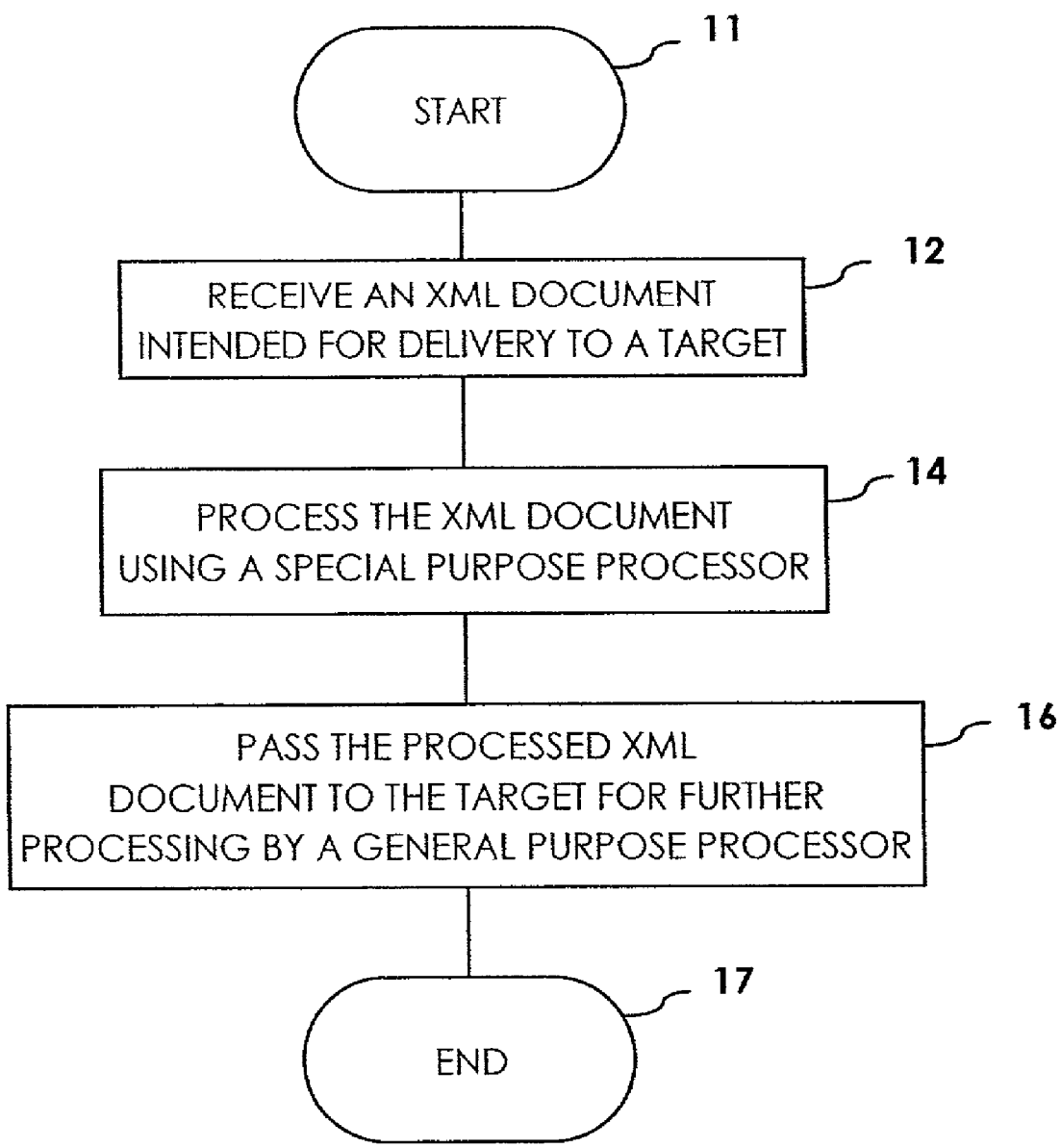
FIG. 1 provides a flowchart which sets forth an overview of exemplary logic for processing documents in accordance with the present invention.

FIG. 1 provides a flowchart 10 which sets forth an overview of exemplary logic for processing documents in accordance with the present invention. As used herein, "processing" refers to parsing, transforming, e.g. applying a style sheet and/or adding/modifying/deleting data from a document/document tree and/or formatting data and other traditional XML processing steps, including XML encoded document recognition, content based routing, etc. The exemplary logic may be used by a hardware-based or software-based implementation of the special purpose processor in accordance with the present invention, as discussed further below.

As shown in FIG. 1, the method starts with receipt of a document, e.g. an XML document, intended for delivery to a target, as shown at steps 11 and 12. As used herein, the target could be a target device or a target application process, such as a web browser, business-to-business environment process, business-to-client environment process, business logic process, back-end server process, edge server process, web service information exchange process, etc. The document is then processed using a special purpose processor in accordance with the present invention, as shown at step 14. This relieves a general purpose processor, which has heretofore been used to perform such processing, of the intensive processing which typically significantly burdens system resources. In other words, the processing of the document is offloaded from the general purpose processor which traditionally has performed such processing. The processed document is then passed to the target for further processing, e.g. post-processing including rendering, another transformation, routing to another application process, etc., as shown at step 16. Such post-processing is performed by the general purpose processor, as is well known in the art. It may be advantageous to perform such post-processing at the target. However, the most-intensive processing has been effectively offloaded to the special purpose processor. This greatly enhances system performance. The method then ends, as shown at step 17.

Accordingly, the special purpose processor receives as input an XML document in the form of DOM, DAM, MXML or STREAM and a style sheet. In addition, a node tree associated with the document is communicated to an application process through a bus of a printed circuit board. This occurs regardless of whether the special purpose processor is hardware or software-based (as discussed further below), or whether the special purpose processor is located locally or remotely, as discussed further below. This communication also results regardless of whether the document is transformed or otherwise manipulated after parsing, or a combination thereof.

The added overhead of the human-friendly tag syntax makes processing, e.g. parsing to create the DOM tree, of the document burdensome to the general purpose processor. This burden is unnecessary when the documents will only be "seen" by a computer program, such as for those documents which are formatted for interchange between computer programs for business-to-business ("B2B") or business-to-consumer ("B2C") use.

One way to improve processing efficiency is to abandon the human-friendly tag structure. The assignee hereof has previously developed a machine-oriented notation for use as an XML alternative. The machine-oriented notation improves processing time for arbitrarily-structured documents and reduces the storage requirements and transmission costs of data interchange while still retaining the extensibility and flexibility of XML and while conveying equivalent content and semantic information. This machine-oriented notation is referred to herein as "mXML". U.S. Pat. No. 6,904,562, titled "Machine-Oriented Extensible Document Representation And Interchange Notation" (application Ser. No. 09/652,056), filed Aug. 31, 2000 discloses the mXML notation, as well as a method, system, and computer program product for operating upon (e.g. parsing, and storing documents in) mXML. Accordingly, in a preferred embodiment, the dedicated processor is configured to understand and interpret mXML, thereby resulting in processing efficiencies.

Creation of a DOM tree is computationally expensive in terms of processing time and memory requirements. Using this tree-oriented DOM representation as an internal storage format requires a considerable amount of memory and/or storage space to store the required objects. In addition, a number of computer program instructions must be executed to allocate memory and create the objects, delete objects and de-allocate memory, and traverse the tree structure to perform operations thereon. Execution of these instructions increases the processing time required for structured documents, as do the operating system-invoked instructions which are periodically executed to perform "garbage collection" (whereby the space being used by objects can be reclaimed after the objects have been logically deleted or de-allocated).

Another way to improve processing efficiency is to use an array-based notation. The Xalan XSLT (Extensible Language Transformations) processor from the Apache Software Foundation reduces the number of objects used by DOM processors somewhat by providing an in-memory Document Table Model ("DTM") representation of a DOM tree. An array is used instead of a set of "real objects" for storing the DOM tree itself. However, there are still many objects around to represent the XML data content of a document (including objects for the nodes, node values, attributes, attribute values, etc.). Array-based processing makes it easier to navigate the tree structure, e.g. for transformation purposes, etc. Accordingly, by implementing array-based processing into the dedicated processor, further performance gains are realized. In a highly preferred embodiment, the dedicated processor is configured to process a document using the array-based notation disclosed in U.S. Pat. No. 6,938,204, titled "Array-Based Extensible Document Storage Format" (application Ser. No. 09/652, 296).

Figure 2A:
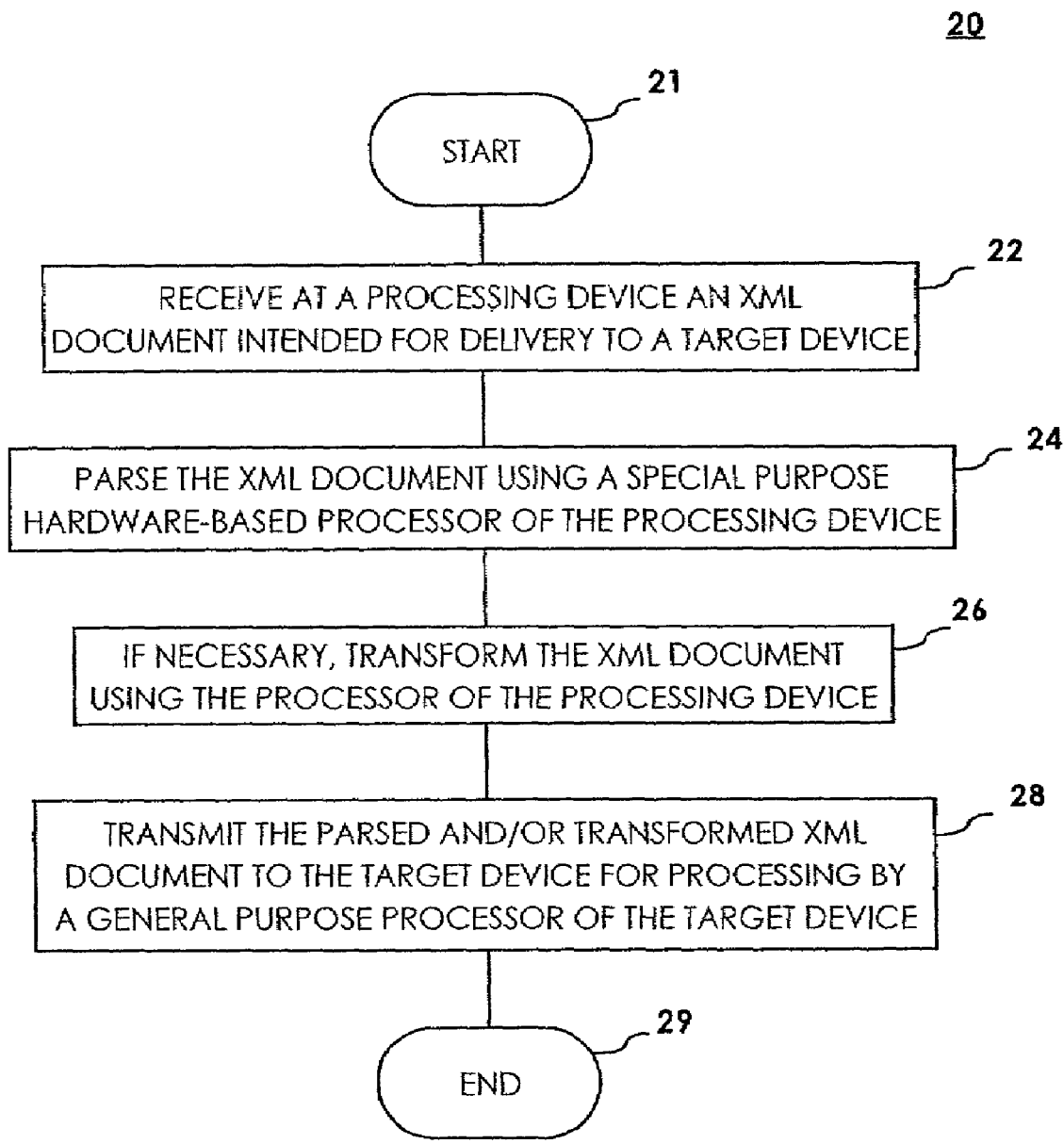
FIG. 2A provides a flowchart which sets forth a first embodiment of exemplary logic for processing documents in accordance with FIG. 1.

FIG. 2A provides a flowchart 20 which sets forth a first embodiment of exemplary logic for processing documents in accordance with FIG. 1. In the example of FIG. 2A, a hardware-based special purpose processor is provided remotely, e.g. as a special purpose chip or chipset in a network-accessible processing device. Specifically, the special purpose processor is provided at a device different from the device where the general purpose processor that has traditionally performed the software-based processing of such documents resides. For example, this arrangement is advantageous in network-based applications, e.g. by providing a network accessible having a special purpose processor for offloading processing from, and thereby supporting, numerous devices. Alternatively, the special purpose processor may be provided locally, i.e. in the same device where the general purpose processor that has traditionally performed the software-based processing of such documents. For example, the special purpose processor may be provided locally to offload processing from an associated general purpose processor. In other words, when provided locally, the special purpose processor offloads processing from a general purpose processor within the same device. When provided remotely, the special purpose processor offloads processing from a general purpose processor within a remote device. Advantageously, the offloaded processing is conducted in a manner that is transparent to the user.

Figure 3:
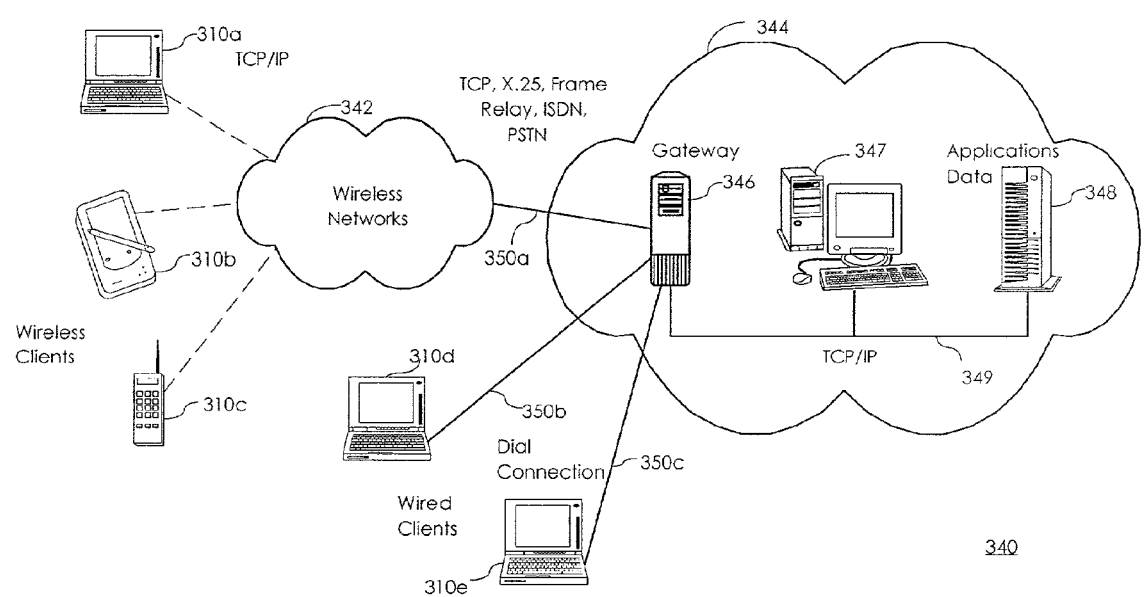
FIG. 3 is a diagram of a networked computing environment in which the present invention may be practiced.

FIG. 3 is a diagram of a networked computing environment in which a remotely provided hardware-based special purpose processor according to the present invention may be practiced. The network of FIG. 3 is discussed in greater detail below. For the example of FIG. 2A, consider that gateway server 346 of FIG. 3 is a processing device having a hardware-based special purpose processor as described above. In this example, device 310a is a personal computer device 310a that is connected to server 346 by a communications network. Consider that device 310a is the target device for an XML document served by data server 348.

More specially, consider that web browser software being executed by a general purpose processor within device 310*a* is the target application process. Typical web browser software is capable of processing HTML, but not XML. Accordingly, a JAVA or other plug-in software application is typically executed by a general purpose processor within the device to translate the XML to HTML for post-processing, e.g. interpretation and display, by the web browser and general purpose processor. This places a burden on the general purpose processor of the target devices to convert XML to HTML. Accordingly, in this example, server 346 is provided with a hardware-based special purpose processor for processing XML documents. In the example of FIG. 2A, and as shown in FIG. 3, an XML document deliverable to device 310*a* from data server 348 is first received (and implicitly recognized as such by a hardware or software based recognition engine) at an intermediate processing device (server 346) as shown at step 22 of FIG. 2A. The XML document is then processed, e.g. parsed by the hardware-based special processor of server 346, as shown at step 24 of FIG. 2A. For example, such parsing results in creation of a document tree data model representing the XML document, e.g. in document object model (DOM) format. Alternatively, the special purpose processor of device 346 is configured parse the document to create a data model in document array model (DAM) format. For example, a document array model may be created in accordance with the method described in U.S. Pat. No. 6,938,204, titled "Array-Based Extensible Document Storage Format" (application Ser. No. 09/652,296).

Optionally, e.g. if required for the target device, the document is further processed to perform a transformation, as shown at step 26 of FIG. 2A. For example, such transformations are typically performed to format content deliverable to handheld devices such as personal digital assistant (PDA) device 310*b* or web-enabled wireless telephone 310*c* of FIG. 3. For example, such transformations are now typically performed by IBM's Websphere® (Transcoding Product (WTP) software, e.g. stored on gateway server 346 of FIG. 3. Using the special purpose processor to perform such transformation provides a substantial improvement in system performance (e.g. in processing device 346). The particular transformation required is typically device specific, e.g. to provide lower-resolution or no images, etc., or user-specific, e.g. according to a user-preference profile, for example, to eliminate certain types of content.

Referring again to FIG. 2A, the processed, e.g. parsed and/or transformed, XML document is transmitted via a communications network to the target device for post-processing by the target device's general purpose processor, as shown at step 28. For example, this step may be performed by the CPU of personal computer device 310*b* of FIG. 3, e.g. to display the document via web browser software. The process then ends, as shown at step 29. In this manner, burdens on the general purpose processor of the target device normally associated with parsing and/or transforming of the document are eliminated by offloading such burdens to the special purpose processor of the processing device, e.g. server 346.

Figure 2B:
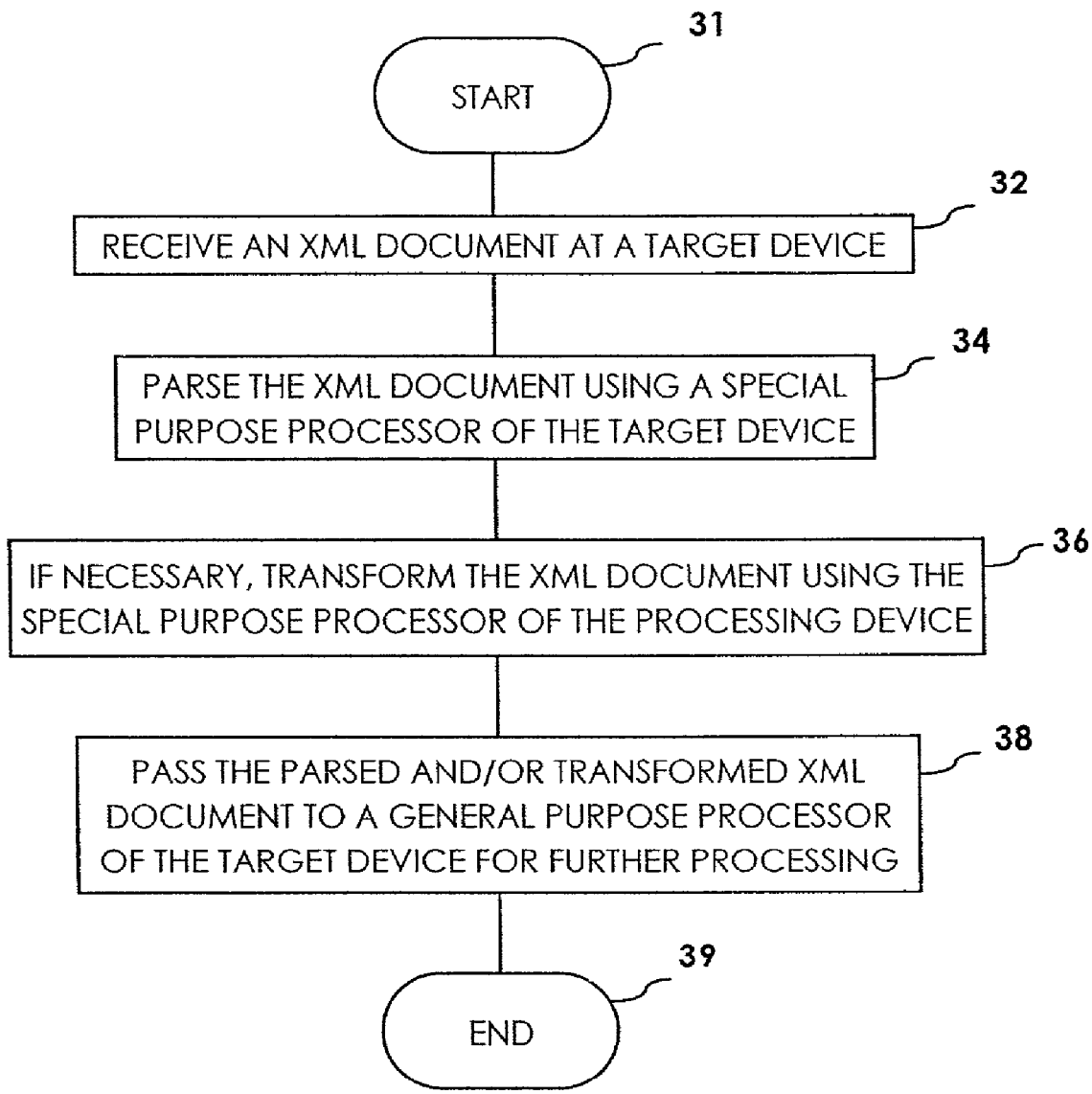
FIG. 2B provides a flowchart which sets forth a second embodiment of exemplary logic for processing documents in accordance with FIG. 1.

FIG. 2B provides a flowchart 30 which sets forth a second embodiment of exemplary logic for processing documents in accordance with FIG. 1. In the example of FIG. 2B, a software-based special purpose processor is provided. Although it is possible to provide the software-based processor remotely, in this example, the software-based processor is provided locally, i.e. to offload processing from a general purpose processor within the same device. For example, this arrangement is advantageous in multi-processor systems, and in systems which are not capable of communicating via a communications network.

The networked computing environment of FIG. 3 can also be used to practice the invention according to the logic set forth in FIG. 2B. For the example of FIG. 2B, consider that server 346 of FIG. 3 is a multi-processor processing device and that a software-based special purpose processor is implemented in server 346 by dedicating one of the general purpose processors to the task of XML processing, by running software stored in the memory of server 346. For this example, consider that server 346 is the target, unlike the example of FIG. 2A discussed above in which the workstation 310*a* was the target and processing was being offloaded from the workstation 310*a* to the special processor of server 346 (a remotely provided special purpose processor example). In this example, processing is being offloaded from the general purpose processor of server 346 to the special purpose processor of server 346. A processing device in accordance with the present invention is discussed in detail below with reference to FIG. 4.

Referring to FIGS. 2B and 3, the process starts with receipt of an XML document at the processing (in this case target) device, as shown at steps 31, 32 of FIG. 2B. The XML document is then parsed and transformed by the special purpose processor, as shown at steps 34 and 36 of FIG. 2B. These steps are similar to steps 24 and 26 of FIG. 2A. However, in this example, these steps are performed by the local special purpose processor 432 (in this example a general purpose processor which runs software stored in the memory 418, 430 of the workstation 410) of the processing device of FIG. 4. The parsed and/or transformed XML document is then passed to the general purpose processor, as shown at step 38, e.g. for post-processing. For example, this step includes communicating a node tree representing the document to an application process running locally through a bus of a printed circuit board. Because the special processor is provided locally, this step need not include transmitting the processed document via a communications network, as in the example of FIG. 2A.

In summary, a special processor could be provided locally in server 346 of FIG. 3 to offload processing from a general purpose processor in server 346 (a local embodiment) or to offload processing from a workstation, e.g. 310*b* (a remote embodiment). In either of the local or remote embodiments, the special processor may be provided in either a hardware implementation (a special purpose chip or chipset) or a software implementation (an additional general purpose processor and special purpose software).

Network

FIG. 3 illustrates an exemplary data processing network 340 in which the present invention may be practiced. The data processing network 340 may include a plurality of individual networks, such as wireless network 342 and network 344, each of which may include a plurality of individual workstations/devices, e.g. 410*a*, 410*b*, 410*c*. Additionally, as those skilled in the art will appreciate, one or more LANs may be included (not shown), where a LAN may comprise a plurality of intelligent workstations coupled to a host processor.

The networks 342 and 344 may also include mainframe computers or servers, such as a gateway computer 346 or application server 347 (which may access a data repository 348). A gateway computer 346 serves as a point of entry into each network 344. The gateway computer 346 may be preferably coupled to another network 342 by means of a communications link 350*a*. The gateway computer 346 may also be directly coupled to one or more workstations, e.g 310*d*, 310*e* using acommunications link 350*b*, 350*c*. The gateway computer 346 may be implemented using any appropriate processor, such as IBM's Network Processor. For example, the gateway computer 346 may be implemented using an IBM pSeries (RS/6000) or xSeries (Netfinity) computer system, an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.) These are merely representative types of computers with which the present invention may be used.

The gateway computer 346 may also be coupled 349 to a storage device (such as data repository 348). Further, the gateway 346 may be directly or indirectly coupled to one or more workstations/devices 310*d*, 310*e*, and servers such as application server 347.

Those skilled in the art will appreciate that the gateway computer 346 may be located a great geographic distance from the network 342, and similarly, the workstations/devices may be located a substantial distance from the networks 342 and 344. For example, the network 342 may be located in California, while the gateway 346 may be located in Texas, and one or more of the workstations/devices 310 may be located in New York. The workstations/devices 310 may connect to the wireless network 342 using a networking protocol such as the Transmission Control Protocol/Internet Protocol ("TCP/IP") over a number of alternative connection media, such as cellular phone, radio frequency networks, satellite networks, etc. The wireless network 342 preferably connects to the gateway 346 using a network connection 350*a* such as TCP or UDP (User Datagram Protocol) over IP, X.25, Frame Relay, ISDN (Integrated Services Digital Network), PSTN (Public Switched Telephone Network), etc. The workstations/devices 310 may alternatively connect directly to the gateway 346 using dial connections 350*b* or 350*c*. Further, the wireless network 342 and network 344 may connect to one or more other networks (not shown), in an analogous manner to that depicted in FIG. 3.

The present invention may be used on a client computer or server in a networking environment, or on a standalone workstation (for example, to prepare a file or to process a file which has been received over a network connection, via a removable storage medium, etc.). (Note that references herein to client and server devices are for purposes of illustration and not of limitation: the present invention may also be used advantageously with other networking models.) When used in a networking environment, the client and server devices may be connected using a "wireline" connection or a "wireless" connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The workstation or client computer may be any type of computer processor, including laptop, handheld or mobile computers; vehicle-mounted devices; desktop computers; mainframe computers; etc., having processing (and, optionally, communication) capabilities. The server, similarly, can be one of any number of different types of computer which have processing and communication capabilities. These techniques are well known in the art, and the hardware devices and software which enable their use are readily available.

Processing Device

Figure 4:
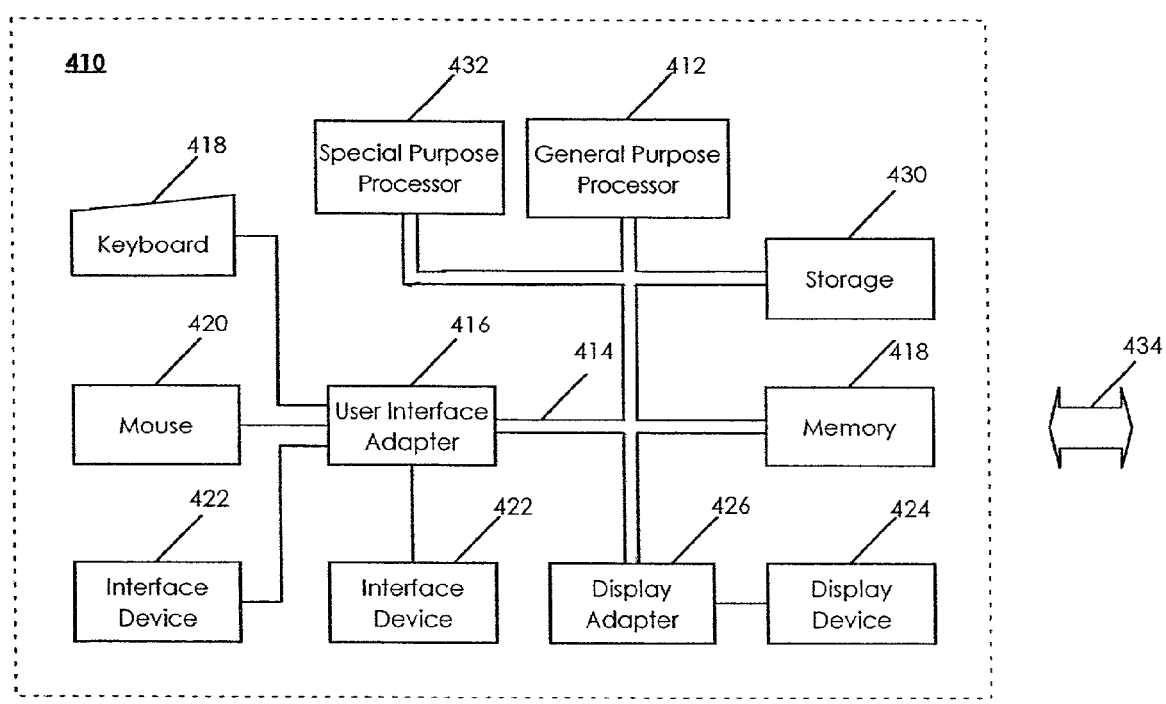
FIG. 4 is a block diagram of a computer workstation environment in accordance with the present invention.

FIG. 4 is a block diagram of a processing device 410 in accordance with the present invention. The exemplary processing device 410 is representative of workstation 310*a* or server 346 of FIG. 3, as discussed above. This block diagram represents hardware for a local implementation or a remote implementation. However, appropriate software is provided, e.g. stored in the memory, to configure the workstation to offload processing from a local and/or a remote general purpose processor.

As is well known in the art, the workstation of FIG. 4 includes a representative processing device, e.g. a single user computer workstation 410, such as a personal computer, including related peripheral devices. The workstation 410 includes a general purpose microprocessor 412 and a bus 414 employed to connect and enable communication between the microprocessor 412 and the components of the workstation 410 in accordance with known techniques. The workstation 410 typically includes a user interface adapter 416, which connects the microprocessor 412 via the bus 414 to one or more interface devices, such as a keyboard 418, mouse 420, and/or other interface devices 422, which can be any user interface device, such as a touch sensitive screen, digitized entry pad, etc. The bus 414 also connects a display device 424, such as an LCD screen or monitor, to the microprocessor 412 via a display adapter 426. The bus 414 also connects the microprocessor 412 to memory 428 and long-term storage 430 (collectively, "memory") which can include a hard drive, diskette drive, tape drive, etc.

The workstation 410 may communicate with other computers or networks of computers, for example via a communications channel or modem 434. Alternatively, the workstation 410 may communicate using a wireless interface at 434, such as a CDPD (cellular digital packet data) card. The workstation 410 may be associated with such other computers in a LAN or a wide area network (WAN), or the workstation 410 can be a client in a client/server arrangement with another computer, etc. All of these configurations, as well as the appropriate communications hardware and software, are known in the art.

In accordance with the present invention, a special purpose processor 432 is provided in communication with general purpose microprocessor 412, memory 428, long term storage device 430, etc. by bus 414. When used to offload processing from a local general purpose processor, the workstation 410 provides exceptional performance improvements because of the proximity and/or priority of the special processor to the general purpose processor from which processing tasks are offloaded.

In the software-based example of FIG. 2B, the special purpose processor 432 includes a dedicated general purpose microprocessor running processing software stored in the memory 428 and/or storage device 430. In a hardware-based embodiment, the special purpose processor 432 includes a special purpose chip or chipset. In either embodiment, additional performance gains can be realized by configuring the special purpose processor to use array-based processing and/or machine language based processing, e.g. mXML. Additional performance gains can be realized by optimizing the hardware-based embodiment to use such array-based processing and/or mMXL. For example, the special purpose processor 432 may be implemented through a combination of special purpose hardware and microcode that may also include a general purpose processor that offloads nonrepetitive tasks from the special purpose processor, e.g. to t handle infrequent software functions such as processing style sheet updates, managing personalization or content/data, caching, etc.

Having thus described particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method for efficient processing of a document encoded in a markup language, the method comprising the step of:
   communicating a data model representing the document through a bus of a printed circuit board from a special purpose processor configured for processing the document encoded in the markup language, to a general purpose processor configured for further processing of the encoded document as processed by the special purpose processor, each of said special purpose processor and said general purpose processor being provided as a respective integrated circuit on said printed circuit board, wherein said data model represents a document encoded in mXML.

2. The method of claim 1, wherein said data model represents, a document encoded in XML.

3. A method for efficient processing of a document encoded in a markup language, the method comprising the steps of:
   receiving a document intended for delivery to a target;
   processing the document using a special purpose processor dedicated to processing of documents encoded in the markup language, said special purpose processor being provided as a first integrated circuit on a printed circuit board; and passing, by communicating through a bus of a printed circuit board, the processed document to the target for further processing by a general purpose processor including a microprocessor that is provided as a second integrated circuit, separate from the special purpose processor, on the printed circuit board, wherein said processing step comprises creating an array-based model of the document.

4. The method of claim 3, wherein said processing step comprises performing a transformation on the document.

5. A method for efficient processing of a document encoded in a markup language, the method comprising the steps of:
   receiving a document intended for delivery to a target;
   processing the document using a special purpose processor dedicated to processing of documents encoded in the markup language, said special purpose processor being provided as a first integrated circuit on a printed circuit board; and passing, by communicating through a bus of a printed circuit board, the processed document to the target for further processing by a general purpose processor including a microprocessor that is provided as a second intergrate circuit, separate from the special purpose processor, on the oriented circuit board, wherein said processing step comprises creating a tree-based model of the document.

6. A method for efficient processing of a document encoded in a markup language, the method comprising the steps of:
   receiving a document intended for delivery to a target;
   processing the document using a special purpose processor dedicated to processing of documents encoded in the markup language, said special purpose processor being provided as a first integrated circuit on a printed circuit board; and gassing, by communicating through a bus of a printed circuit board, the processed document to the target for further processing by general purpose processor including a microprocessor that is provided as a second integrated circuit, separate from the special purpose processor, on the printed circuit board, wherein said special purpose processor as specially configured for parsing the document.

7. The method of claim 6, wherein said passing step comprises communicating the document, as processed, to an application process through a bus of a printed circuit board.

8. The method of claim 6, wherein said passing step comprises communicating the document, as processed, to a target via a communications network.

9. The method of claim 6, wherein the target is a local application process.

10. The method of claim 6, wherein the target is a remote device.

11. A method for efficient processing of a document encoded in a markup language, the method comprising the steps of:
    receiving a document intended for delivery to a target;
    processing the document using a special purpose processor dedicated to processing of documents encoded in the markup language, said special purpose processor being provided as a first integrated circuit on a printed circuit board; and passing, by communicating through a bus of a printed circuit board, the processed document to the target for further processing by a general purpose processor including a microprocessor that is provided as a second integrated circuit, separate from the special purpose processor, on the printed circuit board, wherein said special purpose processor comprises a supplemental general purpose microprocessor for executing computer readable code for parsing the document, said supplemental general purpose microprocessor being distinct from a primary general purpose microprocessor.

12. A system for efficient processing of a document encoded in a markup language, the system comprising
    a memory provided on a printed circuit board;
    a general purpose processor provided on said printed circuit board and being operatively connected to said memo for executing computer readable code stored in said memory, said computer readable code configuring said general purpose processor to perform processing distinct from certain processing of documents encoded in the markup language; and
    a special purpose processor provided as an integrated circuit on said printed circuit board and being operatively connected to said memory said special purpose processor being specially configured for certain processing of documents encoded in the markup language;
    wherein said special purpose processor is a dedicated processor, and wherein said special purpose processor is configured for parsing documents encoded in machine-oriented extensible markup language (mXML).

13. The system of claim 12, wherein said special purpose processor is configured for transforming documents encoded in extensible markup language (XML).

14. A system for efficient processing of a document encoded in a markup language, the system comprising:
   a memory provided on a printed circuit board;
   a general purpose processor provided on said printed circuit board and being operatively connected to said memory for executing computer readable code stored in said memory, said computer readable code configuring said general purpose processor to perform processing distinct from certain processing of documents encoded in the markup language; and
   a special purpose processor provided as an integrated circuit on said printed circuit board and being operatively connected to said memory said special purpose processor being a specially configured for certain processing of documents encoded in the markup language;
   wherein said special purpose processor is a dedicated processor, and wherein said special purpose processor comprises a dedicated integrated circuit that is specially configured for processing the document.

15. The system of claim 14, further comprising:
   a telecommunications device operatively connected to said general purpose processor and capable of communicating via a communications network; and
   a first program stored in said memory and executable by said general purpose processor for controlling said special purpose processor to process the document, and for communicating the document, as processed, to a target.

16. The system of claim 15, further comprising:
   a second program stored in the memory and executable by said general purpose processor for recognizing the document as encoded in the markup language and responsively controlling said special purpose processor to process the document.

17. The system of claim 14, wherein said special purpose processor comprises a supplemental general purpose processor for executing computer readable code for processing the document.

18. The system of claim 17, wherein said computer readable code is configured for processing the document in machine-oriented extensible markup language (mXML).

19. The system of claim 14, further comprising:
   a telecommunications device operatively connected to said general purpose processor and capable of communicating via a communications network; and
   a first program stored in said memory and executable by said general purpose processor for controlling said special purpose processor to process the document, and for communicating the document, as processed, to a target.

20. The system of claim 19, further comprising:
   a second program stored in the memory and executable by said general purpose processor for recognizing the document as encoded in the markup language and responsively controlling said special purpose processor to process the document.

* * * * *

UNITED STATES PATENT AND TRADEMARK OFFICE
CERTIFICATE OF CORRECTION

PATENT NO. : 7,013,424 B2 Page 1 of 1
APPLICATION NO. : 09/848828
DATED : March 14, 2006
INVENTOR(S) : James et al.

It is certified that error appears in the above-identified patent and that said Letters Patent is hereby corrected as shown below:

Column 2,
Lines 10-11, should read -- 1998" which is available on the World Wide Web at URL w3.org, for more information on XML. --.
Line 42, should read -- available on the Web at URL www.w3.org. "DOM" is a trademark --.

Column 11,
Line 67, should read -- purpose processor, on the printed circuit board, --.

Column 12,
Line 11, should read -- circuit board; and passing, by communicating through --.
Line 17, should read -- said special purpose processor is specially configured --.
Line 56, should read -- memory for executing computer readable code stored in --.

Signed and Sealed this

Fourth Day of July, 2006

JON W. DUDAS
*Director of the United States Patent and Trademark Office*